(12) United States Patent
Maguin et al.

(10) Patent No.: US 9,587,544 B2
(45) Date of Patent: Mar. 7, 2017

(54) DEVICE FOR DELIVERING A LIQUID ADDITIVE

(71) Applicant: CONTINENTAL AUTOMOTIVE GMBH, Hannover (DE)

(72) Inventors: Georges Maguin, Marly (FR); Cheikh Diouf, Silly-sur Nied (FR); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/773,219

(22) PCT Filed: Feb. 25, 2014

(86) PCT No.: PCT/EP2014/053615
§ 371 (c)(1),
(2) Date: Sep. 4, 2015

(87) PCT Pub. No.: WO2014/135398
PCT Pub. Date: Sep. 12, 2014

(65) Prior Publication Data
US 2016/0010530 A1 Jan. 14, 2016

(30) Foreign Application Priority Data
Mar. 6, 2013 (DE) .................. 10 2013 102 235

(51) Int. Cl.
F01N 3/20 (2006.01)
B60K 13/04 (2006.01)

(52) U.S. Cl.
CPC ............ *F01N 3/2066* (2013.01); *B60K 13/04* (2013.01); *F01N 2610/02* (2013.01);
(Continued)

(58) Field of Classification Search
CPC ............... F01N 3/2066; F01N 2610/02; F01N 2610/1406; F01N 2610/1426; F01N 2610/1433; F01N 2610/1466
(Continued)

(56) References Cited

U.S. PATENT DOCUMENTS 5,049,267 A 9/1991 Sasaki et al.
5,924,445 A 7/1999 Ambrose et al.
(Continued)

FOREIGN PATENT DOCUMENTS

DE 34 08 520 9/1984
DE 102009029400 A1 3/2011
(Continued)

*Primary Examiner* — Jorge Leon, Jr.
(74) *Attorney, Agent, or Firm* — Cozen O'Connor

(57) ABSTRACT

A device for delivering a liquid additive includes: a tank configured to store the liquid additive; a pump; a suction point at which the liquid additive can be sucked out of the tank by the pump; and a filter at least partially delimiting an intermediate space between the filter and the suction point and separating the intermediate space from an interior space of the tank. The filter has a filter surface with a top edge and a bottom edge, the top edge and the bottom edge being spaced apart from one another in a vertical direction by 30 mm to 80 mm and the suction point being positioned at most 5 mm below the top edge in the vertical direction.

9 Claims, 3 Drawing Sheets

(52) U.S. Cl.
CPC ........... *F01N 2610/1406* (2013.01); *F01N 2610/1426* (2013.01); *F01N 2610/1433* (2013.01); *Y02T 10/24* (2013.01)

(58) Field of Classification Search
USPC .......................................... 60/286, 295, 301
See application file for complete search history.

(56) References Cited

U.S. PATENT DOCUMENTS

| | | | | |
|---|---|---|---|---|
| 2013/0025269 A1* | 1/2013 | Hodgson | ............... | F01N 3/2066 60/317 |
| 2013/0232957 A1* | 9/2013 | Brueck | ................ | F01N 3/2066 60/295 |

FOREIGN PATENT DOCUMENTS

| | | | | |
|---|---|---|---|---|
| DE | 102010014314 A1 | | 10/2011 | |
| DE | 102010039056 A1 | | 2/2012 | |
| DE | 102011105893 A1 | | 12/2012 | |
| DE | WO 2013000525 A1 * | | 1/2013 | ........... F01N 3/2066 |
| DE | 10 2011 119 772 | | 6/2013 | |

* cited by examiner

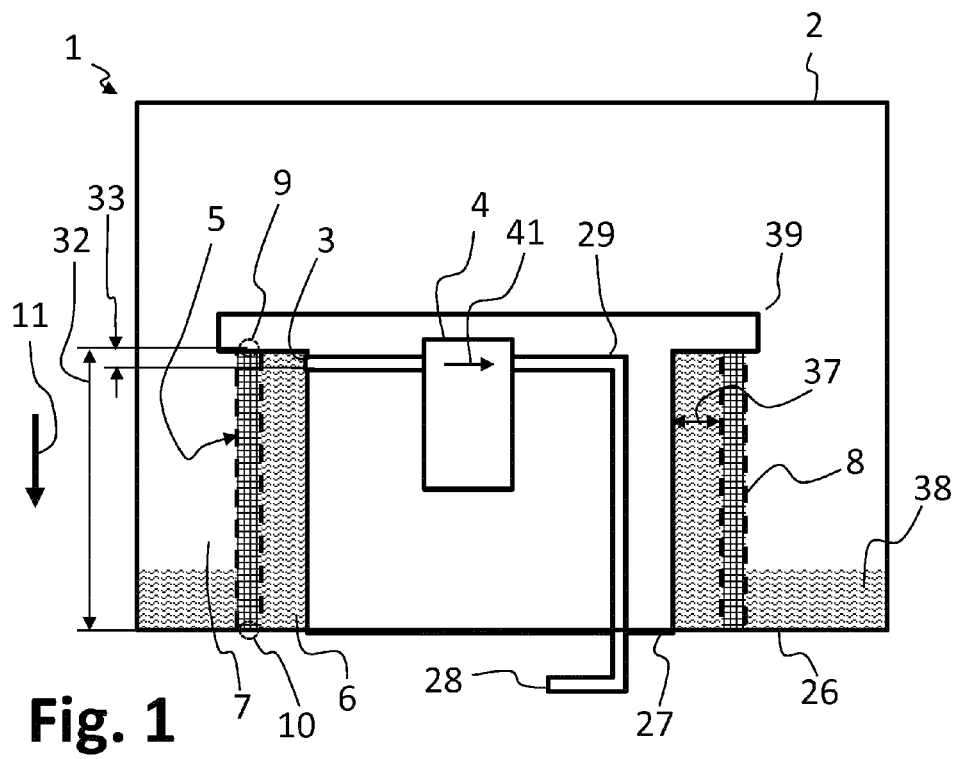
Fig. 1
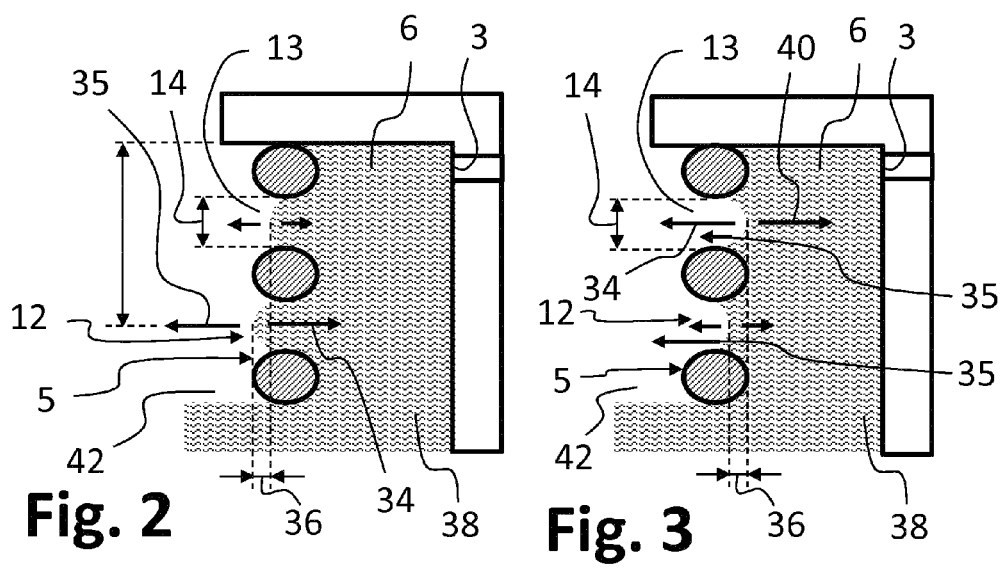
Fig. 2   Fig. 3

DEVICE FOR DELIVERING A LIQUID ADDITIVE

CROSS-REFERENCE TO RELATED APPLICATIONS

This is a U.S. national stage of application No. PCT/EP2014/053615, filed on 25 Feb. 2014, which claims priority to the German Application No. DE 10 2013 102 235.9 filed 6 Mar. 2013, the content of both incorporated herein by reference.

BACKGROUND OF THE INVENTION

1. Field of the Invention

The invention relates to a device for delivering a liquid additive. Devices of said type are used for example in motor vehicles in order to supply a liquid additive to an exhaust-gas treatment device for the purification of the exhaust gases of an internal combustion engine. The invention is used in particular in exhaust-gas treatment devices in which nitrogen compounds in the exhaust gas react, with the aid of a reducing agent, to form non-hazardous substances. The corresponding exhaust-gas purification method implemented in said exhaust-gas treatment devices is the method of selective catalytic reduction (SCR method).

2. Related Art

Ammonia is normally used as reducing agent for the SCR method. Ammonia is normally supplied to the exhaust-gas treatment device not directly but rather in the form of a reducing agent precursor solution, which can be stored and provided as liquid additive. A widely used reducing agent precursor solution in this context is urea-water solution. For exhaust-gas purification, a 32.5% urea-water solution is available under the trade name AdBlue®.

For the provision of such liquid additives in motor vehicles, it is normally necessary to provide a tank for storing the liquid additive and a device for delivering and/or providing the liquid additive. The device for providing the liquid additive should also comprise a filter, because the liquid additive often contains impurities. Such impurities can damage components of the provision device and/or the exhaust-gas treatment device and must therefore be removed from the liquid additive.

A further problem of liquid additives of this type is that they can freeze at low temperatures. The urea-water solution described above, for example, freezes at −11° C. In the automotive field, such low temperatures arise in particular during long standstill phases in winter. The liquid additive expands as it freezes. The expansion can damage and even destroy lines and ducts in which liquid additive is still situated. It is therefore necessary to implement measures for preventing damage to the provision device by freezing additive.

For effective exhaust-gas purification, it is furthermore necessary for the liquid additive to be supplied to the exhaust-gas treatment device in accurately dosed fashion. It is necessary in particular to prevent air bubbles from passing into the device for delivering liquid additive. Air bubbles influence the delivered amount of liquid additive, wherein the influence often cannot be precisely determined because it is (often) not possible (by sensors) to distinguish whether air bubbles or liquid additive are being delivered.

Furthermore, a tank for storing the liquid additive and a device for providing the liquid additive require additional space and lead to additional weight in a motor vehicle. It is therefore advantageous for a device for delivering liquid additive to be able to empty a tank as completely as possible. Even when the tank has already been almost completely emptied, it should still be ensured that no air bubbles are delivered. The tank could then be designed to be very small, such that the additional weight of the tank is low and the tank has a small space requirement.

SUMMARY OF THE INVENTION

Taking this prior art as a starting point, it is an object of the present invention to solve, or at least lessen, the technical problems of the prior art. It is sought in particular to propose a particularly advantageous device for delivering liquid additive, by which device firstly empties a tank for storing the liquid additive substantially completely, and secondly (even in the delivery phase) it is reliably obtained that no air bubbles, or particularly few air bubbles, are sucked into the device for delivering the liquid additive.

According to one aspect of the invention, the device for delivering a liquid additive has at least the following components:

a tank for storing the liquid additive,
a suction point at which the liquid additive can be sucked out of the tank by a pump of the device,
a filter which at least delimits an intermediate space between the filter and the suction point and separates the intermediate space from an interior space of the tank.

The filter also has a filter surface with a top edge and a bottom edge, wherein the top edge and the bottom edge are spaced apart from one another in a vertical direction by 30 mm [millimeters] to 80 mm and the suction point is positioned at most 5 mm below the top edge in the vertical direction.

The device preferably comprises an installation unit which can be inserted into an opening in a tank base of a tank for storing the liquid additive. The installation unit preferably has a housing which can be inserted into the described opening in the tank base so as to close off the opening in a fluid-tight manner. The suction point is arranged on the housing so as to be situated in the tank when the installation unit has been inserted into the tank base. The device preferably also has a line connector at which the liquid additive is provided. The line connector is preferably arranged on the housing so as to be situated outside the tank when the installation unit has been inserted into the tank base.

A delivery duct extends through the housing from the suction point to the line connector, along which delivery duct the liquid additive is delivered in a delivery direction. The pump for delivering the liquid additive is also arranged on the delivery duct. Further components that participate in the delivery of the liquid additive may also be arranged in the housing. Such components may, for example, be sensors, valves and/or control elements.

The housing is preferably of cylindrical form such that it can be inserted into a circular opening in the tank base. The filter preferably forms a (substantially encircling) circumferential surface around the housing. The intermediate space between the filter and the suction point is consequently preferably an approximately annular or approximately cylindrical gap between the filter and the housing of the device. In the intermediate space there may be arranged supporting structures which support the filter against the housing such that the position of the filter relative to the housing is fixedly defined.

The interior space refers to the (entire) space within the tank, which is filled with liquid additive and which does not belong to the intermediate space. The interior space and the intermediate space are preferably separated from one another by the filter such that liquid additive, which is to pass from the interior space into the intermediate space, must inevitably pass through the filter. The filter thus retains impurities of the liquid additive in the interior space. The liquid additive is thus purified.

The filter surface preferably describes a two-dimensional extent of the filter along the circumferential surface of the housing of the device. The filter surface is preferably between 90 cm² and 600² [square centimeters] in area. The top edge is the highest region of the filter in the vertical direction. The lower edge is the lowest region of the filter in the vertical direction. The vertical direction is preferably defined by the force of gravity that acts on the device when the device is installed in its predefined installation position in a motor vehicle. The top edge and the lower edge are preferably linear boundary regions of the filter. If the filter is formed in an encircling manner around a housing, the top edge and the bottom edge are preferably in each case (approximately) annular. The spacing of 30 mm to 80 mm between the top edge and the bottom edge constitutes the maximum extent of the filter in the vertical direction and may also be referred to as the filter height.

The suction point is positioned at most 5 mm below the top edge of the filter. It is thereby ensured that a volume situated within the intermediate space above the suction point in the vertical direction is as small as possible. The suction point is preferably even arranged such that no (considerable) volume exists in the intermediate space above the suction point. The suction point then opens into the intermediate space from above.

As a result of the defined spacing between the top edge and the bottom edge of the filter and the position of the suction point in the upper region of the filter, it is possible in any and every operating situation of the device for air to be prevented from being present in the intermediate space between the filter and the suction point. During the suction of liquid additive at the suction point, the liquid additive is always sucked through the entire intermediate space between the suction point and the filter. The formation of an air bubble of unknown size in an upper region of the intermediate space is not possible. Air present in the intermediate space is always discharged immediately after the start of the delivery of the liquid additive. Air never passes in an uncontrolled manner and at an unknown time from the tank into the extraction and delivery device. For this reason, it is possible by the described device to ensure a particularly accurately dosed provision of liquid additive.

The device is furthermore advantageous if the filter has an outer surface oriented towards the interior space and which has inlet openings with a hydraulic diameter of between 100 μm [micrometers] and 260 μm.

The filter preferably has a thickness or a filter depth of, for example, between 0.5 mm and 2 mm [millimeters]. The outer surface delimits the material of the filter in the direction of the interior space of the tank. The inlet openings constitute openings at which the liquid additive can enter the material of the filter in order to pass into the interior space between the filter and the suction point. The hydraulic diameter of an inlet opening is defined by the circumferential length and the area of the openings. In the case of circular inlet openings, the hydraulic diameter corresponds to the actual diameter of the circular inlet opening. The inlet openings on the outer surface of the filter are however in fact usually not circular but rather have a shape that deviates from the circular shape. The deviating shape arises, for example, as a result of the construction of the filter from wires, fibers and/or from plastic filaments. The constituent parts delimit the inlet openings. They form webs between the inlet openings. The hydraulic diameter is defined by the following formula:

$$Diameter_{hydraulic} = \frac{4 \cdot \text{cross} - \text{sectional area}}{\text{circumferential length}}$$

The hydraulic diameter of the inlet openings is representative for the capillary forces generated at the outer surface when a boundary surface between air in the interior space of the tank and liquid additive in the intermediate space exists at the outer surface. The capillary forces are determined substantially by the surface tensions of the air, the liquid additive and by the material of the filter. If the hydraulic diameter of the inlet openings at the outer surface is set in the specified range, it is ensured that no air passes through the inlet openings into the intermediate space between the filter and the suction point. Further conditions should be adhered to for this purpose. For example, the negative pressure generated by the pump at the suction point during the suction of the liquid additive should not exceed a threshold value, because otherwise the described capillary forces could be overcome. A further additional boundary condition is, for example, the spacing between the top edge and the bottom edge of the filter, which spacing should lie in the range specified further above. Owing to the hydrostatic pressure of the liquid additive in the tank, different pressures can prevail across the filter surface in the vertical direction. If the maximum vertical extent of the filter is between 30 mm and 80 mm, it is possible to prevent that the different pressures on the filter surface cause that the described capillary forces are overcome in regions. Yet another boundary condition is, for example, a maximum delivery rate of the liquid additive.

An excessively high delivery rate, too, could cause the described capillary forces to be overcome.

The device is furthermore advantageous if ducts extend from the inlet openings on the outer surface of the filter to the outlet openings on an inner surface, which is oriented towards the intermediate space, of the filter.

The inner surface constitutes the delimitation of the filter material of the filter in the direction of the intermediate space. The ducts that run through the filter to the outlet openings on the inner surface need not be ordered. They may be ducts that run in a chaotic or irregular manner and which are possibly formed by a statistically distributed structure of the filter material. Effective purification of the liquid additive can take place in such ducts of the filter, for example, by virtue of the liquid additive being diverted in the ducts and impurities of the liquid additive being deposited in the filter.

The device is furthermore advantageous if the ducts form a branched duct system.

A branched duct system is characterized in particular in that not always precisely one duct runs (in an aligned manner) from an inlet opening on the outer surface to an outlet opening on the inner surface, but rather a plurality of outlet openings may be connected to one inlet opening and, conversely, a plurality of inlet openings may be connected to one outlet opening. It is also possible for additional connecting ducts to exist by which a plurality of ducts from an inlet opening to an outlet opening are connected to one another. The duct system within the filter may form in particular a porous structure or a porosity of the filter material of the filter.

It is furthermore advantageous for the hydraulic diameter of the ducts to vary from the inlet openings towards the outlet openings.

Such a variation of the hydraulic diameter is preferably uniform as viewed over the filter surface as a whole. That is to say in particular that, regardless of which inlet opening liquid additive passes through into a duct in the filter, the hydraulic diameter of the respective duct always varies equally from the inlet opening towards the outlet opening. Here, structural irregularities are acceptable within appropriate limits. For example, the filter may be constructed so as to become more coarsely porous or more finely porous from the inlet openings towards the outlet openings. It is also possible for the filter to be particularly coarse at the inlet openings, to then become finer, and to subsequently become coarser again towards the outlet openings. Specific capillary force effects at the outer surface and if appropriate also at the inner surface of the filter can be attained by such a construction. This makes it possible for the entry of air bubbles into the intermediate space to be prevented in a particularly effective manner, and at the same time for the discharge of air bubbles out of the intermediate space to be permitted if air bubbles have passed into the intermediate space.

The device is furthermore advantageous if the filter is constructed from a tangle of fibers.

A tangle of fibers (composed of super-fine wires, filaments, fibers etc.) constitutes a particularly effective option for providing a filter having the properties described further above. Such a filter makes it possible in particular for liquid additive to be extracted at a suction point in the upper region of an intermediate space between the filter and the suction point, because the described effects of the capillary forces occur at a filter of this type. The fibers may be, for example, plastic fibers, ceramic fibers and/or metallic fibers.

It is a further possibility for the filter to be formed from an open-pored foamed material. Such an (open) foamed material likewise has continuous ducts.

The device is furthermore advantageous if the pump is designed to build up a negative pressure of between 300 Pa [pascals] and 800 Pa in the intermediate space.

As a result of the negative pressure built up by the pump, the liquid additive is sucked out of the interior space and through the filter and the intermediate space to the suction point. A negative pressure in the stated range firstly makes it possible for liquid additive to be delivered through the filter to the suction point in an effective manner. Furthermore, capillary forces, which act on the filter and which prevent air from passing into the intermediate space, are not overcome. It is thus possible for air to be prevented from passing into the intermediate space.

The device is furthermore advantageous if the intermediate space has a thickness of between 1 mm [millimeters] and 10 mm.

The intermediate space itself is likewise preferably of an annular or cylindrical form. The intermediate space is particularly preferably formed as an annular or cylindrical gap between the filter and a housing of the device. The thickness of the intermediate space defines the spacing between the inner surface of the filter and the housing of the device. A thickness of the intermediate space in the stated range makes it possible for liquid additive to pass from any point of the filter to the suction point with low flow resistance. It is thus possible to avoid pressure differences within the intermediate space, which could possibly lead to the capillary forces described further above being overcome in regions. Furthermore, the thickness of the intermediate space in the stated range ensures that there is adequate storage capacity for liquid additive in the intermediate space and the filter can if appropriate also deform in order to compensate pressure differences between the interior space and the intermediate space, such as arise, for example, if the liquid additive freezes.

It is furthermore sought to specify a motor vehicle having an internal combustion engine and having an exhaust-gas treatment device for the purification of the exhaust gases of the internal combustion engine and also having a described device by which a liquid additive can be supplied to the exhaust-gas treatment device. The exhaust-gas treatment device preferably has a feed device and an SCR catalytic converter. The feed device is supplied with a liquid additive from a tank via a line by a described device. On the SCR catalytic converter, nitrogen oxide compounds in the exhaust gas can be reduced with the aid of the liquid additive.

BRIEF DESCRIPTION OF THE DRAWINGS

The invention and the technical field will be explained in more detail below on the basis of the figures. The figures show particularly preferred embodiments, to which the invention is however not restricted. It is pointed out in particular that the figures, and in particular the illustrated dimensional relationships, are merely schematic. In the figures:

FIG. 1: shows a described device having a tank;
FIG. 2: shows a detail of a described device;
FIG. 3: shows a further detail of a described device.

DETAILED DESCRIPTION OF THE PRESENTLY PREFERRED EMBODIMENTS

Figure 4:
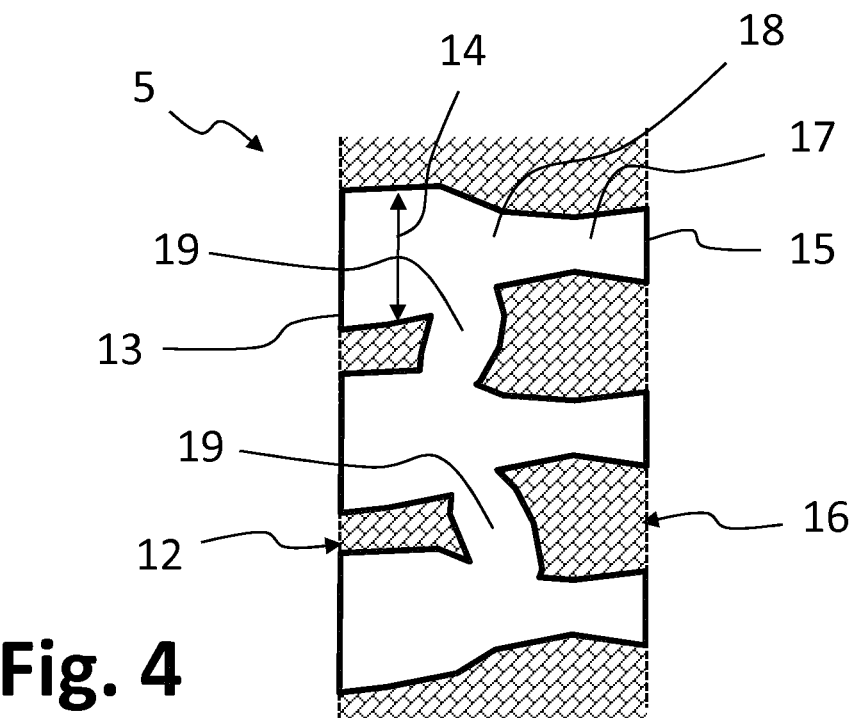
FIG. 4: shows a partial region of a filter.

FIG. 1 shows a device 1 having a tank 2. Liquid additive 38 (such as urea-water solution) is stored in the tank 2. The device 1 comprises an installation component 39, which is inserted into a tank base 26 of the tank 2. The installation component 39 has a housing 27. On the housing 27 there is arranged a suction point 3 at which liquid additive can be extracted from the tank 2. Furthermore, there is provided on the housing 27 a line connector 28 to which another line (not illustrated here) can be connected. The liquid additive 38 can be conducted through the other line, for example, to an exhaust-gas treatment device. A delivery duct 29 extends through the installation component 39 and through the housing 27, which delivery duct 29 connects the suction point 3 to the line connector 28. The liquid additive 38 is delivered through the delivery duct 29 in a delivery direction 41. On the delivery duct 29 there is also arranged a pump 4, which performs the delivery of the liquid additive 38.

The device comprises a (separate) filter, which is preferably formed in an encircling manner around the housing 27. The filter 5 has a filter surface 8 and separates the suction point 3 from an interior space 7 of the tank 2. An intermediate space 6 is situated between the filter 5 and the suction point 3. The intermediate space 6 connects the filter 5 to the suction point 3. Liquid additive, which should pass from the interior space 7 into the intermediate space 6, must pass through the filter 5. The filter 5 has a top edge 9 and a bottom edge 10. The top edge 9 and the bottom edge 10 are preferably each formed in an annularly encircling manner around the housing 27. The filter 5 has a filter height 32 from the top edge 9 to the bottom edge 10 as viewed in the vertical direction 11, wherein the vertical direction 11 is defined by the force of gravity. The suction point 3 is situated on the intermediate space 6 at a suction position 33, which is defined by a spacing of at most 5 mm from the top edge 9.

The function of the filter 5 is explained in more detail in FIGS. 2 and 3. Each illustration shows a section of the intermediate space 6 between the suction point 3 and the filter 5. Also shown in each case is the outer surface 12 of the filter 5. Liquid additive 38 is present in the intermediate space 6 in each case. At the outer surface 12, liquid additive 38 is present only in sections (in the region illustrated at the bottom). Above this, air 42 is present at the outer surface 12. Capillary forces act at the outer surface 12 owing to the fact that liquid additive 38 is present on one side and air 42 is present in sections on the other side. The filter 5 has in each case inlet openings 13 with a hydraulic diameter 14, through which openings liquid additive can enter the intermediate space 6. The hydraulic diameter 14 is definitive of the size of the capillary forces.

In FIG. 2, the same pressure prevails outside the filter 5 and in the intermediate space 6. FIG. 2 describes a rest situation in which no suction of liquid additive 38 is taking place at the suction point 3. In this situation, hydrostatic forces 35 and capillary forces 34 each act in the inlet openings 13, which forces are in equilibrium and ensure that the liquid additive 38 does not escape from the intermediate space 6 through the inlet openings 13. The hydrostatic forces 35 acting in the lower inlet opening 13 illustrated in FIG. 2 are greater than those in the upper inlet opening 13 illustrated. This arises owing to the force of gravity, which is greater at the lower inlet opening 13 than at the upper inlet opening 13. Owing to the greater hydrostatic force 35 at the lower inlet opening 13, the capillary force 34 at the lower inlet opening 13 must also be greater in order to be in equilibrium with the hydrostatic force 35 and to prevent an escape of the liquid additive 38 through the opening 13. The greater capillary force 34 generates an offset 36 of the liquid additive 38 between the upper inlet opening 13 and the lower inlet opening 13. The hydrostatic force 35 forces the liquid additive 38 further out of the inlet openings 13 in the lower region.

In the situation illustrated in FIG. 3, a negative pressure prevails at the suction point 3, which negative pressure causes liquid additive to be sucked out of the intermediate space 6 towards the suction point 3. FIG. 3 describes a situation during the delivery of liquid additive 38. Again, capillary forces 34 act at the inlet openings 13 of the filter 5, which capillary forces prevent air 42 from passing into the intermediate space 6 and liquid additive 38 from escaping from the intermediate space 6. The hydrostatic forces 35 already described in conjunction with FIG. 2 also act. The negative pressure at the suction point 3 however generates an additional pressure force 40 at the inlet openings 13. The resultant of the pressure force 40 and the hydrostatic force 35 is greater at the upper inlet opening 13 than at the lower inlet opening 13 because the pressure force 40 resulting from the negative pressure opposes the hydrostatic force 35. Therefore, the capillary force 34 must also be greater at the upper inlet opening 13 than at the lower inlet opening 13. For this reason, there is also, as per FIG. 3, a resulting offset 36 of the liquid additive at the upper inlet opening 13 in relation to the lower inlet opening 13. In FIG. 3, the capillary forces 34 act in the opposite direction to the direction of action in FIG. 2. Whereas it is substantially the case in FIG. 2 that an escape of the liquid additive 38 from the intermediate space 6 is prevented, it is substantially the case in FIG. 3 that an entry of air 42 into the intermediate space 6 is prevented.

FIG. 4 shows a detail of a filter 5 for a described device according to an embodiment of the present invention. The filter 5 has an outer surface 12 and an inner surface 16. Inlet openings 13 are situated on the outer surface 12 and outlet openings 15 are situated on the inner surface 16. The inlet openings 13 and the outlet openings 15 are connected to one another by ducts 17. The ducts 17 are optionally additionally connected to one another by connecting ducts 19, such that a duct system 18 is formed within the filter 5. The individual ducts 17 have a hydraulic diameter 14, which may vary from the inlet openings 13 towards the outlet openings 15.

Figure 5:
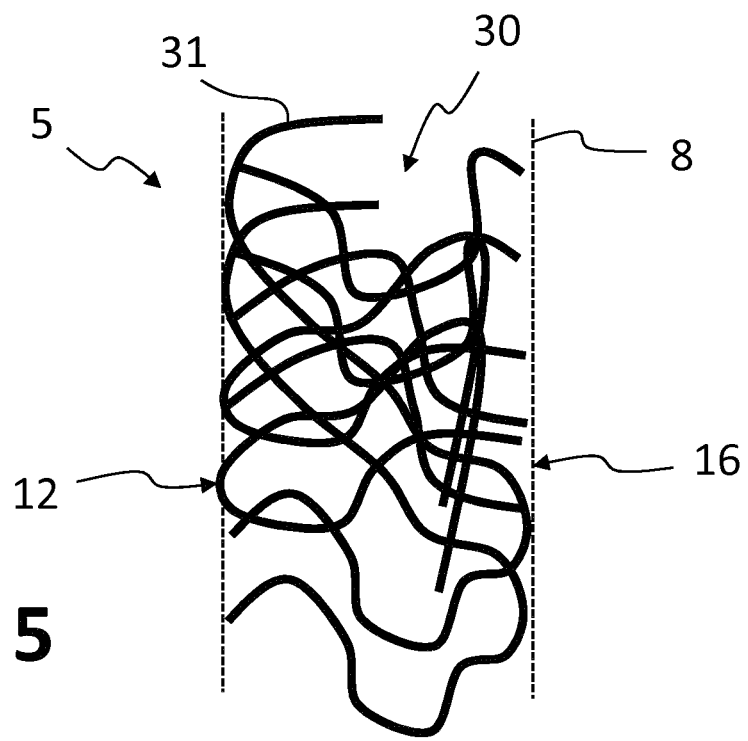
FIG. 5: shows a further partial region of a filter.

FIG. 5 likewise shows a detail of a filter 5, the filter being constructed from fibers 31 which form a tangle of fibers 30. The filter 5 has an outer surface 12 and an inner surface 16, between which is situated the tangle of fibers 30 formed by the fibers 31. The tangle of fibers 30 has a porosity formed by the ducts explained in FIG. 4.

Figure 6:
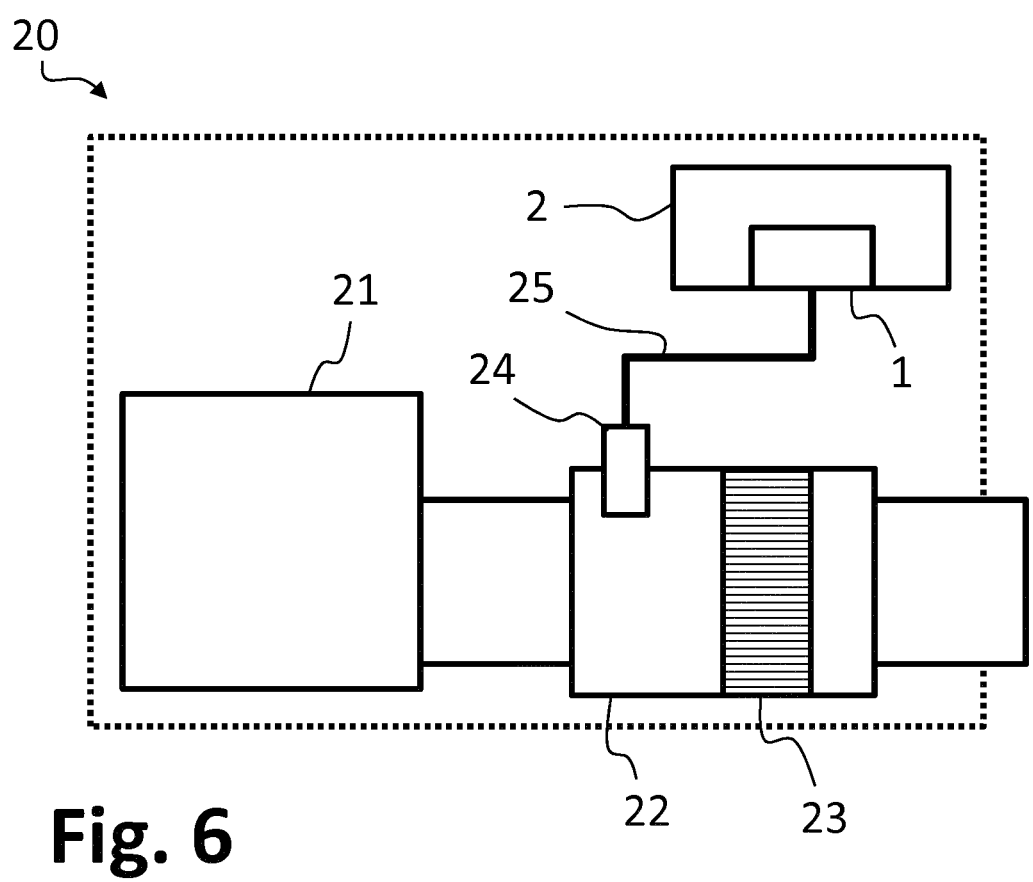
FIG. 6: shows a motor vehicle having a described device.

FIG. 6 shows a motor vehicle 20 having an internal combustion engine 21 and having an exhaust-gas treatment device 22 for the purification of the exhaust gases of the internal combustion engine 21. In the exhaust-gas treatment device 22 there is provided an SCR catalytic converter 23 by which the method of selective catalytic reduction can be carried out. A liquid additive can be supplied to the exhaust-gas treatment device 22 by a feed device 24 (such as an injector), which liquid additive can be delivered from a tank 2 to the feed device 24 through a line 25 by a device 1.

It is obvious that not all of the technical details shown in the individual figures need imperatively be combined in the manner illustrated, but rather may also if appropriate be used separately therefrom in design variants of the invention. At any rate, in this context, this does not apply only if a combination is explicitly specified in the description or the subject matter would no longer be functional without such a combination.

The described invention particularly advantageously makes it possible for a tank filled with liquid additive to be emptied as completely as possible, and for it to simultaneously be ensured that air bubbles cannot pass in an uncontrolled manner into a device for delivering the liquid additive.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device (1) for delivering a liquid additive (38), comprising:
   a tank (2) configured to store the liquid additive (38);
   a pump (4);

a suction point (3) at which the liquid additive (38) is sucked out of the tank (2) by the pump (4); and a filter (5) at least partially delimiting an intermediate space (6) between the filter (5) and the suction point (3) and separating the intermediate space (6) from an interior space (7) of the tank (2), wherein the filter (5) has a filter surface (8) with a top edge (9) and a bottom edge (10), wherein the top edge (9) and the bottom edge (10) are spaced apart from one another in a vertical direction (11) by 30 mm to 80 mm and the suction point (3) is positioned at most 5 mm below the top edge (9) in the vertical direction (11).

2. The device (1) according to claim 1, wherein the filter (5) has: an outer surface (12) oriented towards the interior space (7), and inlet openings (13) with a hydraulic diameter (14) of between 100 µm and 260 µm.

3. The device (1) according to claim 2, further comprising ducts (17) extending from the inlet openings (13) on the outer surface (12) of the filter (5) to outlet openings (15) on an inner surface (16), which inner surface (16) is oriented towards the intermediate space (6) of the filter (5).

4. The device (1) according to claim 3, wherein the ducts (17) form a branched duct system (18).

5. The device (1) according to claim 3, wherein a hydraulic diameter (14) of the ducts (17) varies from the inlet openings (13) towards the outlet openings (15).

6. The device (1) according to claim 1, wherein the filter (5) comprises a tangle of fibers (30).

7. The device (1) according to claim 1, wherein the pump (4) is configured to build up a negative pressure of between 300 Pa [pascals] and 800 Pa in the intermediate space (6).

8. The device (1) according to claim 1, wherein the intermediate space (6) has a thickness (37) of between 1 mm and 10 mm.

9. A motor vehicle (20) comprising:
an internal combustion engine (21);
an exhaust-gas treatment device (22) configured to purify exhaust gases of the internal combustion engine (21); and
the device (1) according to claim 1, by which the liquid additive (38) is supplied to the exhaust-gas treatment device (22).

* * * * *